United States Patent
Kostrubanic et al.

(10) Patent No.: US 10,436,047 B2
(45) Date of Patent: Oct. 8, 2019

(54) METHOD FOR REPAIR OF A DIAPHRAGM OF A ROTARY MACHINE

(71) Applicant: General Electric Company, Schenectady, NY (US)

(72) Inventors: James Michael Kostrubanic, Burnt Hills, NY (US); Joseph Paul Turley, Huntersville, NC (US); Rory Todd Hersom, Bangor, ME (US); Ronald Roy Patterson, Lindstrom, MN (US); Sheldon Dirk Westwood, Arvada, CO (US); Kurt Neal Laurer, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 634 days.

(21) Appl. No.: 14/829,138

(22) Filed: Aug. 18, 2015

(65) Prior Publication Data

US 2017/0051618 A1 Feb. 23, 2017

(51) Int. Cl.
*F01D 25/28* (2006.01)
*F01D 9/04* (2006.01)
(Continued)

(52) U.S. Cl.
CPC .............. *F01D 9/044* (2013.01); *B23P 6/005* (2013.01); *F01D 5/005* (2013.01); *F01D 9/041* (2013.01);
(Continued)

(58) Field of Classification Search
CPC ........ F01D 9/044; F01D 25/285; F01D 9/041; F01D 5/005; F04D 29/544; B23P 6/005;
(Continued)

(56) References Cited

U.S. PATENT DOCUMENTS

| 3,414,958 A | 12/1968 | Anderson |
| 3,636,609 A | 1/1972 | Stahl |

(Continued)

FOREIGN PATENT DOCUMENTS

| CN | 1572406 A | 2/2005 |
| EP | 1898053 A2 | 3/2008 |

(Continued)

OTHER PUBLICATIONS

Extended European Search Report and Opinion issued in connection with corresponding EP Application No. 16183600.2 dated Jan. 20, 2017.

(Continued)

*Primary Examiner* — Sarang Afzali
*Assistant Examiner* — Ruth G Hidalgo-Hernandez
(74) *Attorney, Agent, or Firm* — Armstrong Teasdale LLP

(57) ABSTRACT

A method of repairing a diaphragm of a rotary machine includes removing an initial steam path from the diaphragm. The initial steam path includes a plurality of initial partitions. Each initial partition is associated with an original trailing edge profile and an original axial length. The method also includes coupling a replacement steam path to the diaphragm. The replacement steam path includes a plurality of replacement partitions. Each replacement partition has a replacement axial length that is greater than the original axial length.

18 Claims, 6 Drawing Sheets

(51) Int. Cl.
*B23P 6/00* (2006.01)
*F01D 5/00* (2006.01)
*B23P 15/00* (2006.01)

(52) U.S. Cl.
CPC .......... *F01D 25/285* (2013.01); *B23P 15/006* (2013.01); *F05D 2220/30* (2013.01); *F05D 2230/80* (2013.01); *Y10T 29/49318* (2015.01)

(58) Field of Classification Search
CPC ............... B23P 15/006; F05D 2230/80; F05D 2220/30; Y10T 29/49318
See application file for complete search history.

(56) References Cited

U.S. PATENT DOCUMENTS

| | | |
|---|---|---|
| 5,060,842 A | 10/1991 | Qureshi et al. |
| 5,185,924 A | 2/1993 | Fraser |
| 5,697,151 A | 12/1997 | Werner et al. |
| 5,699,151 A | 12/1997 | Akasu |
| 5,743,711 A | 4/1998 | Fournier et al. |
| 5,895,205 A | 4/1999 | Werner et al. |
| 6,109,869 A | 8/2000 | Maddaus et al. |
| 6,494,683 B1 * | 12/2002 | Nolan ................ B23K 9/0026 29/889.1 |
| 6,754,955 B1 | 6/2004 | Carl, Jr. et al. |
| 7,470,109 B2 | 12/2008 | Tomko et al. |
| 7,713,024 B2 | 5/2010 | Burdgick et al. |
| 7,914,255 B2 | 3/2011 | Workman et al. |
| 2004/0179939 A1 | 9/2004 | Bluhm et al. |
| 2008/0050222 A1 | 2/2008 | Burdgick et al. |
| 2011/0200430 A1 | 8/2011 | Burdgick et al. |
| 2012/0148395 A1 | 6/2012 | Werther et al. |
| 2013/0230403 A1 | 9/2013 | Sassatelli et al. |
| 2014/0044536 A1 * | 2/2014 | Sassatelli ................ B23P 6/005 415/208.1 |

FOREIGN PATENT DOCUMENTS

| | | |
|---|---|---|
| EP | 2 695 703 A2 | 2/2014 |
| JP | H01-237305 A | 9/1989 |
| JP | 2002-168133 A | 6/2002 |
| JP | 2003-020904 A | 1/2003 |
| JP | 2003-161111 A | 6/2003 |
| JP | 2004-169701 A | 6/2004 |
| JP | 2009-002188 A | 1/2009 |
| JP | 2011-094584 A | 5/2011 |
| WO | 2013134181 A1 | 9/2013 |

OTHER PUBLICATIONS

Notification of Reasons for Refusal issued in connection with corresponding JP Application No. 2016-154116 dated Sep. 5, 2017.
First Office Action and Search issued in connection with corresponding CN Application No. 201610683397.8 dated Jan. 11, 2018.
JP Notice of Reasons for Refusal received for related application 2016-154116 dated Jun. 24, 2019; 10 pp.

* cited by examiner

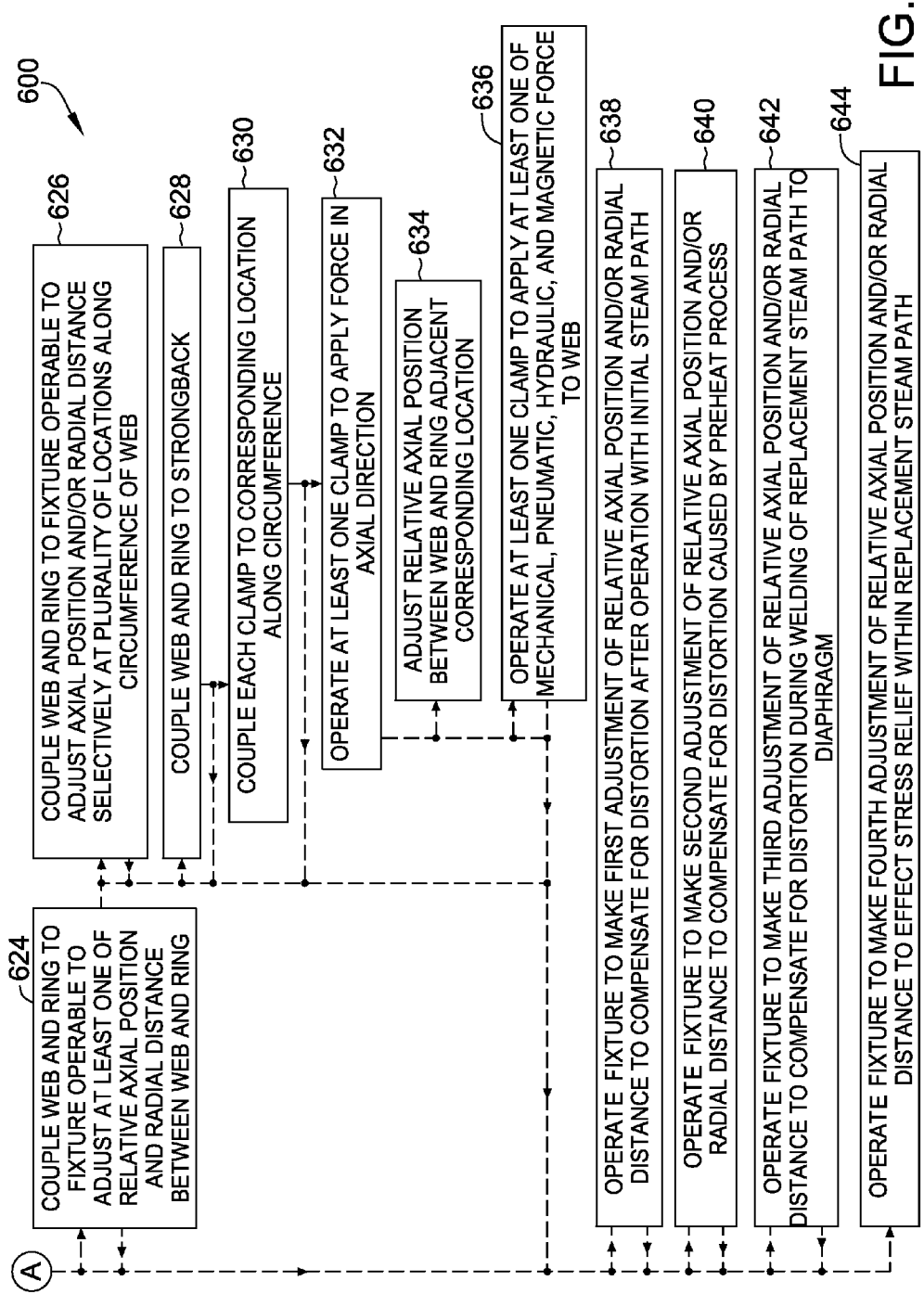

METHOD FOR REPAIR OF A DIAPHRAGM OF A ROTARY MACHINE

BACKGROUND

The field of the disclosure relates generally to a diaphragm of a rotary machine, and more particularly to a method and apparatus for replacing a diaphragm of a rotary machine.

At least some known rotary machines, including some known steam turbines, include a diaphragm (or static nozzle) positioned upstream of a row of rotor blades. Such diaphragms include a plurality of airfoil-shaped partitions disposed in a fluid flow path. The partitions are selectively shaped and oriented in a profile that directs the fluid flow at a predetermined angle to the row of rotor blades. For example, the predetermined angle facilitates an efficiency of the row of rotor blades in extracting energy from the fluid flow. However, for at least some known diaphragms, harsh environmental conditions along the flow path, such as, but not limited to, exposure to high-temperature, high-pressure, and/or high-moisture content fluid and/or solid particle impingement, eventually result in creep distortion, erosion, and/or other damage to the partitions, such that the diaphragm requires repair.

At least some known repair methods for such diaphragms include rebuilding each partition using a weld build-up while the diaphragm is in place, and manually grinding the weld build-up to restore the original partition profile. However, in at least some cases, a difficulty in welding and grinding the in-place airfoil results in an inability to restore the original profile, thus changing the predetermined angle and reducing an efficiency of the rotor blades. Alternatively, at least some known repair methods for such diaphragms include welding a pre-machined replacement trailing edge section to an original section of the partition, and hand-machining the weld to restore the original profile. However, in at least some cases, a difficulty in positioning the replacement section with respect to the in-place partition during welding, and a difficulty in machining the in-place partition, again results in an inability to restore the original profile. Moreover, in at least some cases, each such known repair process is time consuming, thus requiring a large amount of out-of-service time for the rotary machine. Furthermore, in at least some cases, each such known repair process results in a diaphragm which again may be susceptible to creep distortion and/or other damage during further operation of the rotary machine, requiring future repairs.

BRIEF DESCRIPTION

In one aspect, a method of repairing a diaphragm of a rotary machine is provided. The method includes removing an initial steam path from the diaphragm. The initial steam path includes a plurality of initial partitions. Each initial partition is associated with an original trailing edge profile and an original axial length. The method also includes coupling a replacement steam path to the diaphragm. The replacement steam path includes a plurality of replacement partitions. Each replacement partition has a replacement axial length that is greater than the original axial length.

BRIEF DESCRIPTION OF THE DRAWINGS

FIG. 7 is a continuation of the flow diagram of FIG. 6.

DETAILED DESCRIPTION

The exemplary methods and apparatus described herein overcome at least some of the disadvantages associated with known methods of repairing a diaphragm of a rotary machine. The embodiments described herein provide a replacement steam path for the diaphragm. More specifically, the replacement steam path includes a plurality of replacement partitions, and each replacement partition has an axial length that is greater than the axial length of the initial partitions. In some embodiments, each replacement partition has a preselected trailing edge profile. Moreover, in some such embodiments, the preselected trailing edge profile is substantially the original trailing edge profile of the initial partitions. In certain embodiments, a web and a ring of the diaphragm are coupled to a fixture to facilitate coupling of the replacement steam path to the diaphragm. More specifically, the fixture is operable to adjust at least one of a relative axial position of, and a radial distance between, the web and the ring selectively at a plurality of locations along a circumference of the web.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
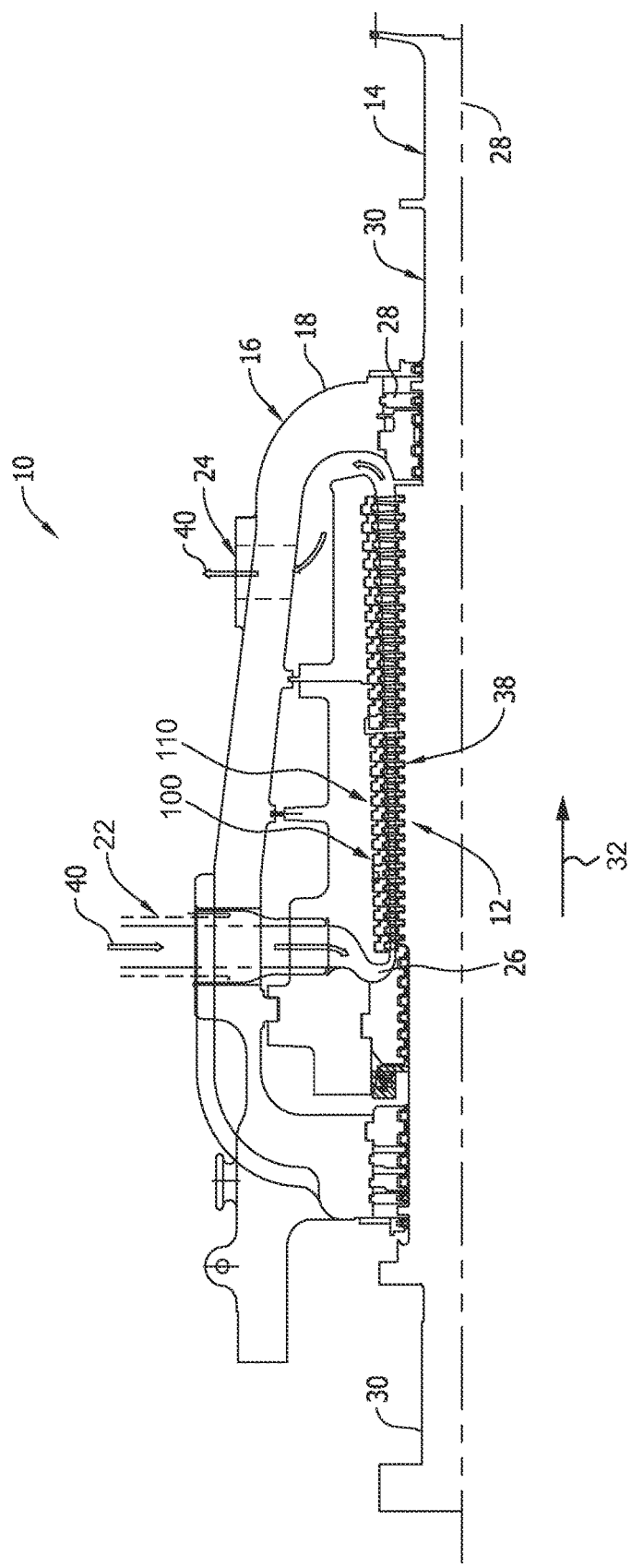
FIG. 1 is a schematic view of an exemplary steam turbine.

FIG. 1 is a schematic view of an exemplary steam turbine 10. In the exemplary embodiment, steam turbine 10 is a single-flow steam turbine. In alternative embodiments, steam turbine 10 is an opposed-flow steam turbine. Moreover, the present embodiments are not limited to only being used in steam turbines, but rather can be used in other rotary machine systems, such as gas turbines.

In the exemplary embodiment, steam turbine 10 includes a plurality of turbine stages 12. Each turbine stage 12 includes a plurality of rotor blades 38 coupled to shaft 14. It should be noted that, as used herein, the term "couple" is not limited to a direct mechanical, electrical, and/or communication connection between components, but may also include an indirect mechanical, electrical, and/or communication connection between multiple components. Rotor blades 38 are disposed circumferentially around, and extend radially outward from, shaft 14. Plurality of rotor blades 38 includes any suitable number of rotor blades 38 that enables steam turbine 10 to operate as described herein. Shaft 14 is supported at opposing end portions 30 of shaft 14 by bearings (not shown).

A casing 16 surrounds plurality of turbine stages 12. A plurality of diaphragms 100 is coupled to casing 16, such that a respective diaphragm 100 is positioned upstream of each turbine stage 12. Each diaphragm 100 includes a plurality of initial partitions 110. Initial partitions 110 are generally airfoil shaped and are disposed circumferentially around, and extend radially inward from, casing 16.

Steam turbine 10 includes a high pressure steam inlet 22 and a low pressure steam exhaust 24. Shaft 14 is rotatable about a centerline axis 28. During operation, high-pressure and high-temperature steam 40 is channeled from a steam source, such as a boiler or the like (not shown), through HP steam inlet 22 into an inlet 26. From inlet 26, steam 40 is channeled in a downstream direction 32 through casing 16, where it encounters turbine stages 12. As the steam impacts rotor blades 38, it induces rotation of shaft 14 about centerline axis 28. Thus, thermal energy of steam 40 is converted to mechanical rotational energy by turbine stages 12. Steam 40 exits casing 16 at low pressure steam exhaust 24. Steam 40 is then channeled to the boiler (not shown), where it is reheated, and/or to other components of the system, for example, a low pressure turbine section or a condenser (not shown).

Figure 2:
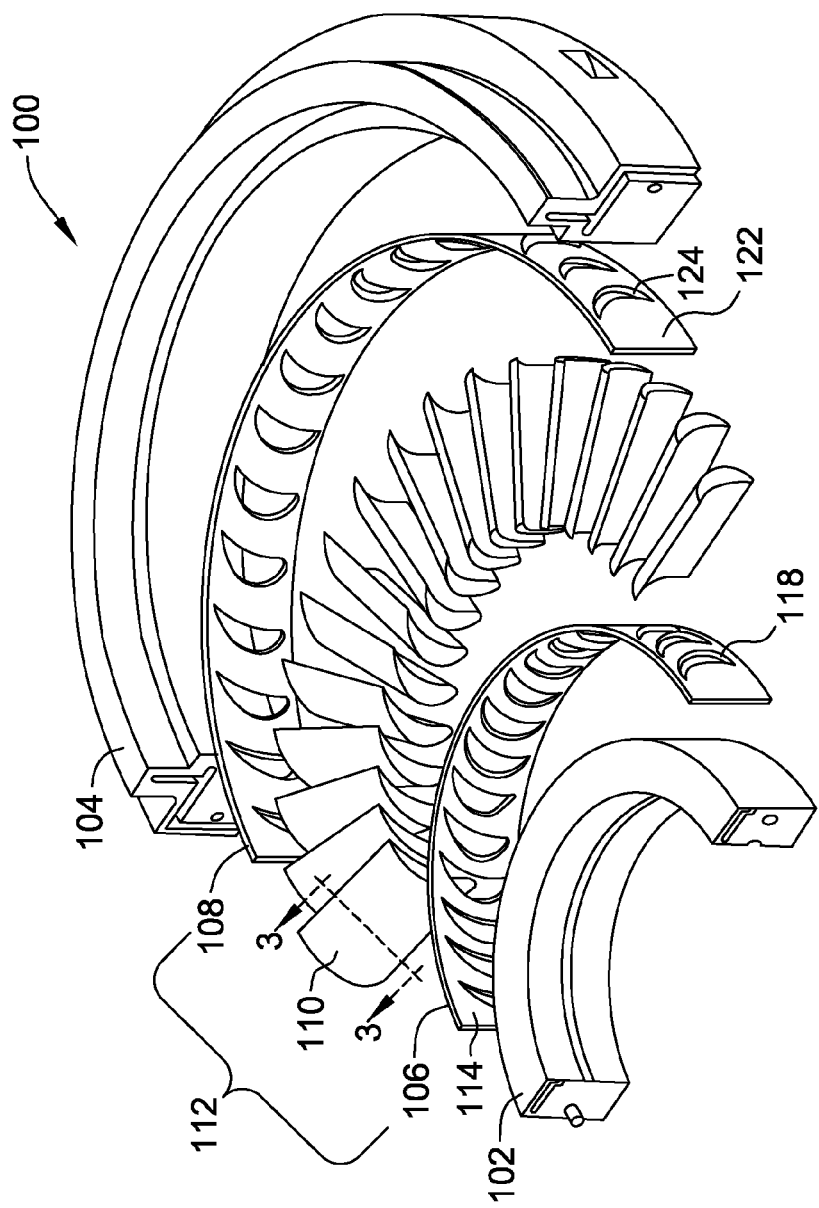
FIG. 2 is an exploded schematic perspective view of a half section of an exemplary diaphragm that may be used with the exemplary steam turbine shown in FIG. 1.

FIG. 2 is an exploded schematic perspective view of a half section of an exemplary diaphragm 100 for use with steam turbine 10 (shown in FIG. 1). Diaphragm 100 includes a radially inner web 102 and a radially outer ring 104. Ring 104 is configured for coupling to casing 16, and web 102 is configured for positioning circumferentially around shaft 14.

Diaphragm 100 also includes an initial radially inner band 106, an initial radially outer band 108, and a plurality of circumferentially spaced initial partitions 110 that extend generally radially between inner band 106 and outer band 108. Inner band 106, outer band 108, and partitions 110 cooperate to define an initial steam path 112 of diaphragm 100. Moreover, a radially inner surface 114 of initial steam path 112 is configured to couple to web 102 in any suitable fashion, and a radially outer surface 122 of initial steam path 112 is configured to couple to ring 104 in any suitable fashion.

In the exemplary embodiment, inner band 106, outer band 108, and partitions 110 are coupled together to form initial steam path 112 by welding. More specifically, in the exemplary embodiment, inner band 106 includes a plurality of openings 118 configured to receive a radially inner end of initial partitions 110 therethrough, and the radially inner end is then welded to radially inner surface 114. Similarly, outer band 108 includes a plurality of openings 124 configured to receive a radially outer end of initial partitions 110 therethrough, and the radially outer end is then welded to radially outer surface 122. In alternative embodiments, inner band 106, outer band 108, and partitions 110 are coupled together in any suitable fashion to form initial steam path 112.

Figure 3:
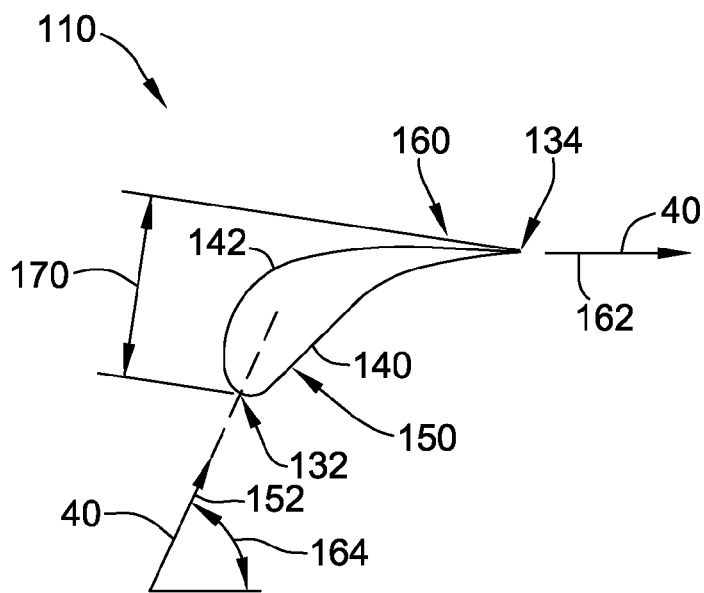
FIG. 3 is a schematic cross-sectional view of an exemplary initial partition of the exemplary diaphragm shown in FIG. 2, taken along lines 3-3 shown in FIG. 2.

FIG. 3 is a schematic cross-sectional view of an exemplary one of initial partitions 110 taken along lines 3-3 shown in FIG. 2. In the exemplary embodiment, initial partition 110 includes a pressure side surface 140 and an opposing suction side surface 142 coupled together at a leading edge 132 and at a trailing edge 134. A forward portion 150 of initial partition 110 is defined downstream of leading edge 132. As originally formed, forward portion 150 defines an original forward profile that is shaped and oriented to receive steam 40 flowing in a first direction 152.

Also in the exemplary embodiment, a trailing edge portion 160 of initial partition 110 is defined between forward portion 150 and trailing edge 134. As originally formed, trailing edge portion 160 defines an original trailing edge profile that is shaped and oriented to direct steam 40 in a second direction 162 as steam 40 exits diaphragm 100. In certain embodiments, second direction 162 is preselected to facilitate efficient operation of a downstream row of rotor blades 38 (shown in FIG. 1) at a design operating point of steam turbine 10.

An angle 164 is defined between first direction 152 and second direction 162. In addition, an axial length 170 of initial partition 110 is defined in a direction parallel to shaft 14 (shown in FIG. 1). As originally formed, forward portion 150 and trailing edge portion 160 cooperate to efficiently redirect steam 40 from first direction 152 to second direction 162. However, although initial partition 110 is associated with the original forward and trailing edge profiles, environmental conditions during operation of steam turbine 10 (shown in FIG. 1) potentially cause initial partition 110 to change shape, thereby decreasing an efficiency of initial partition 110. For example, but not by way of limitation, web 102 and ring 104 creep axially relative to one another, causing creep distortion in initial partition 110.

Figure 4:
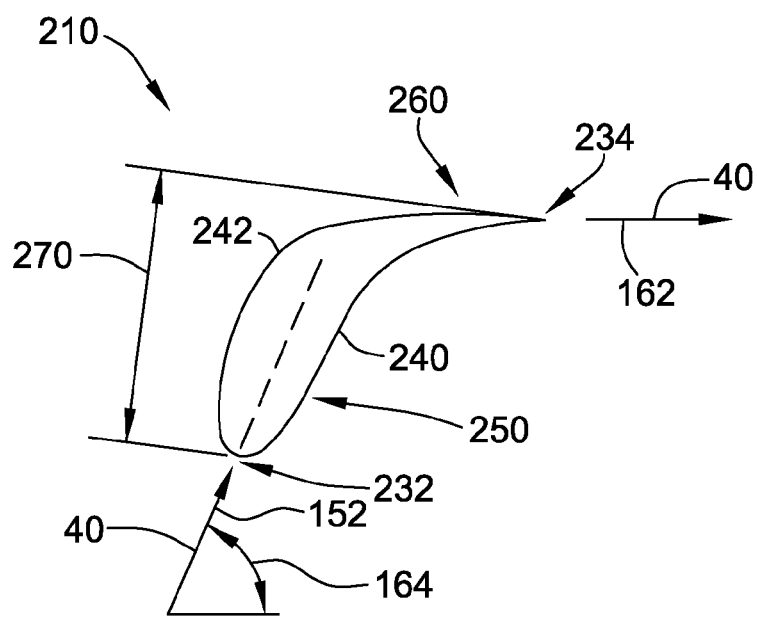
FIG. 4 is a schematic cross-sectional view of a replacement partition for use with the exemplary diaphragm shown in FIG. 2.

FIG. 4 is a schematic cross-sectional view of a replacement partition 210 for use with diaphragm 100 shown in FIG. 2. More specifically, the cross-sectional view of FIG. 4 is taken along lines substantially identical to the cross-sectional view of initial partition 110 shown in FIG. 3. In the exemplary embodiment, replacement partition 210 includes a pressure side surface 240 and an opposing suction side surface 242 coupled together at a leading edge 232 and at a trailing edge 234. A forward portion 250 of replacement partition 210 is defined downstream of leading edge 232, and a trailing edge portion 260 of replacement partition 210 is defined between forward portion 250 and trailing edge 234.

With reference to FIGS. 3 and 4, trailing edge portion 260 of replacement partition 210 defines a preselected trailing edge profile that is shaped and oriented to direct steam 40 as steam 40 exits diaphragm 100. In the exemplary embodiment, like trailing edge portion 160 of initial partition 110, the preselected trailing edge profile of trailing edge portion 260 of replacement partition 210 is shaped and oriented to direct steam 40 in second direction 162 as steam 40 exits diaphragm 100. More specifically, in the exemplary embodiment, the preselected trailing edge profile of replacement partition 210 is substantially the original trailing edge profile associated with initial partition 110. Thus, replacement partition 210 facilitates restoring the efficient operation of the downstream row of rotor blades 38 (shown in FIG. 1) provided by initial partition 110 in its original state.

In alternative embodiments, trailing edge portion 260 of replacement partition 210 defines the preselected trailing edge profile that is shaped and oriented to direct steam 40 in a direction other than second direction 162 as steam 40 exits diaphragm 100. For example, but not by way of limitation, a user of steam turbine 10 operates steam turbine 10 at a user operating point that differs from a design operating point associated with second direction 162 and the original trailing edge profile associated with initial partition 110. As a result, the preselected trailing edge profile of trailing edge portion 260 of replacement partition 210 is shaped and oriented to direct steam 40 in a direction (not shown) that facilitates increased efficiency of the downstream row of rotor blades 38 (shown in FIG. 1) at the user operating point. Thus, in some embodiments, replacement partition 210 facilitates improving an efficiency of steam turbine 10 beyond that provided by initial partition 110 in its original state.

In the exemplary embodiment, forward portion 250 defines a replacement forward profile that is shaped and oriented to receive steam 40 flowing in first direction 152. However, forward portion 250 of replacement partition 210 is elongated as compared to forward portion 150 of initial partition 110. More specifically, forward portion 250 is elongated such that an axial length 270 of replacement partition 210 is greater than axial length 170 of initial partition 110. In certain embodiments, axial length 270 of replacement partition 210 being greater than axial length 170 of initial partition 110 provides diaphragm 100 with increased resistance to certain types of damage, such as, but not limited to, creep distortion. For example, but not by way of limitation, replacement partitions 210 provide greater resistance to an axial creep of web 102 and ring 104 (shown in FIG. 2) relative to one another. Thus, in certain embodiments, replacement of initial partitions 110 with replacement partitions 210 not only substantially restores or improves an original efficiency of diaphragm 100, but also improves a durability of diaphragm 100 during future operations, thereby increasing a time period of operation of steam turbine 10 (shown in FIG. 1) before another repair is needed.

In the exemplary embodiment, forward portion 250 of replacement partition 210 is elongated, as compared to forward portion 150 of initial partition 110, in a direction parallel to first direction 152. In some embodiments, elongation of forward portion 250 parallel to first direction 152 facilitates efficient redirection of steam 40 from first direction 152 through angle 164 to second direction 162. In alternative embodiments, forward portion 250 is elongated in a direction other than parallel to first direction 152.

Figure 5:
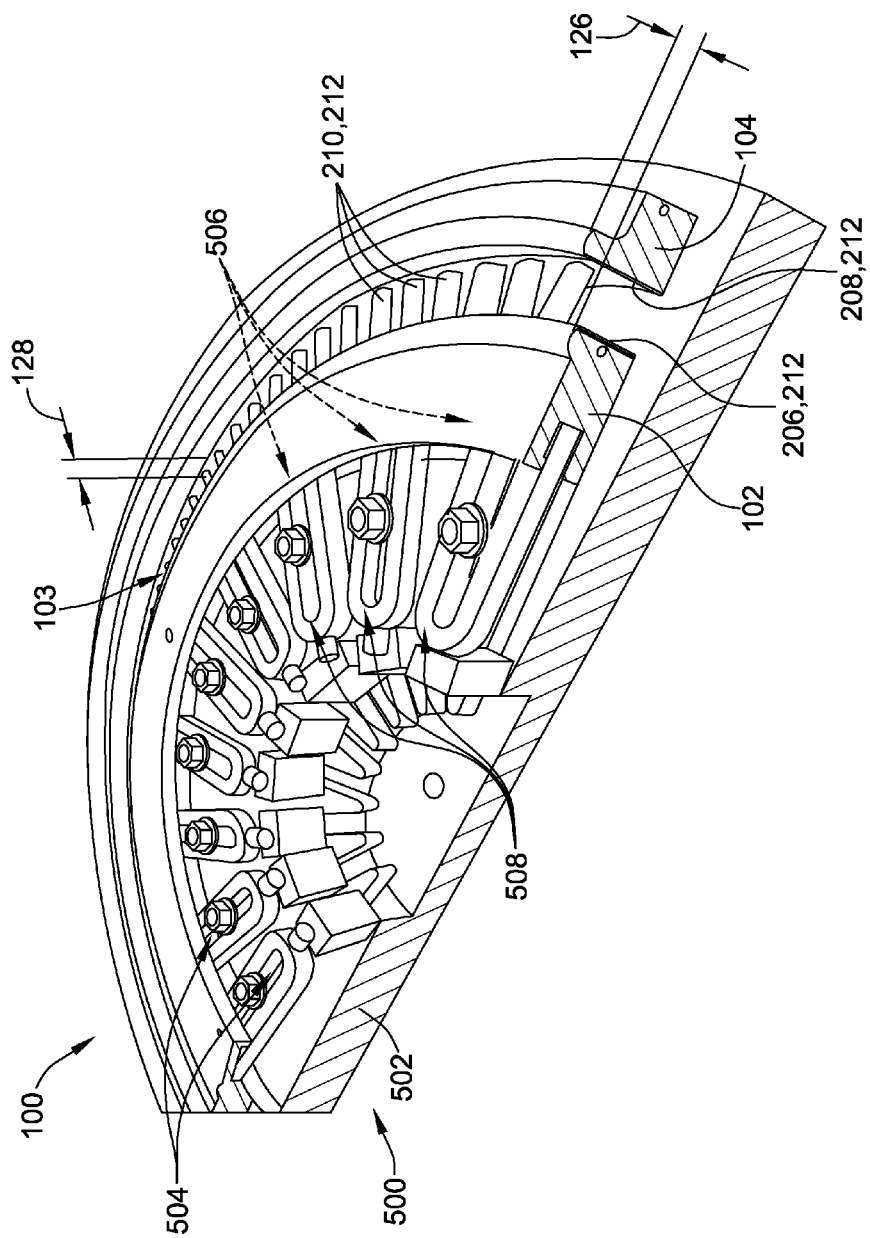
FIG. 5 is a schematic perspective view of the half section of the exemplary diaphragm shown in FIG. 1 coupled to an exemplary replacement steam path.

FIG. 5 is a schematic perspective view of a half section of diaphragm 100 coupled to an exemplary replacement steam path 212. In the exemplary embodiment, replacement steam path 212 includes a replacement inner band 206, a replacement outer band 208, and a plurality of circumferentially spaced replacement partitions 210 (also shown in FIG. 4) that extend generally radially between replacement inner band 206 and replacement outer band 208. In the exemplary embodiment, replacement inner band 206 and replacement outer band 208 are selected to be substantially similar to initial inner band 106 and initial outer band 108. In alternative embodiments, replacement inner band 206 and replacement outer band 208 are selected to have any suitable configuration that enables diaphragm 100 to function as described herein. In the exemplary embodiment, replacement partitions 210 are circumferentially spaced in substantially identical configuration to the circumferential spacing of initial partitions 110. In alternative embodiments, replacement partitions 210 are circumferentially spaced in any suitable configuration that enables diaphragm 100 to function as described herein.

Replacement inner band 206, replacement outer band 208, and replacement partitions 210 are coupled together in any suitable fashion to form replacement steam path 212, such as, but not limited to, in the fashion described above for initial steam path 112. In addition, a radially inner surface (not visible) of replacement steam path 212 is coupled to web 102 in any suitable fashion, and a radially outer surface (not visible) of replacement steam path 212 is coupled to ring 104 in any suitable fashion.

Moreover, in the exemplary embodiment, replacement steam path 212 is formed prior to coupling replacement steam path 212 to either of web 102 and ring 104 of diaphragm 100. Thus, steam turbine 10 (shown in FIG. 1) remains operable with initial steam path 112 while replacement steam path 212 is formed, reducing a required out-of-service time of steam turbine 10 for installation of replacement partitions 210. In alternative embodiments, at least one component of replacement steam path 212 is coupled to at least one of web 102 and ring 104 prior to forming replacement steam path 212.

In certain embodiments, web 102 and ring 104 are coupled to a fixture 500 to facilitate coupling of replacement steam path 212 to diaphragm 100. More specifically, in the exemplary embodiment, fixture 500 is operable to adjust a relative axial position 126 of web 102 and ring 104 selectively at a plurality of locations along a circumference 103 of web 102. Also in the exemplary embodiment, fixture 500 is operable to adjust a radial distance 128 between web 102 and ring 104 selectively at the plurality of locations along a circumference 103 of web 102. Thus, fixture 500 facilitates coupling of replacement steam path 212 to diaphragm 100 with increased precision in an axial positioning of replacement steam path 212, and with reduced or eliminated distortion of replacement steam path 212. In alternative embodiments, replacement steam path 212 is coupled to diaphragm 100 other than by using fixture 500.

In the exemplary embodiment, fixture 500 includes a strongback 502 and a plurality of circumferentially spaced clamps 504 coupled to strongback 502. Each clamp 504 is coupleable in any suitable fashion to a corresponding location 506 proximate circumference 103 of web 102. Moreover, each clamp 504 is operable to apply a force in an axial direction to correspondingly adjust relative axial position 126 of web 102 and ring 104 adjacent the respective location 506. For example, but not by way of limitation, each clamp 504 is suitably configured to apply one of a mechanical force, a pneumatic force, a hydraulic force, and a magnetic force to web 102 in the axial direction at the respective location 506. In alternative embodiments, fixture 500 includes any suitable structure that enables fixture 500 to function as described herein.

Also in the exemplary embodiment, a radially extending slot 508 is defined in each clamp 504. Each clamp 504 is radially positionable relative to strongback 502 using slot 508, such that fixture 500 is adjustable to accommodate a range of sizes of diaphragm 100. Moreover, each clamp 504 is operable to apply a force in a radial direction to correspondingly adjust radial distance 128 between web 102 and ring 104 adjacent the respective location 506. In alternative embodiments, fixture 500 includes any suitable structure that enables fixture 500 to accommodate a range of sizes of diaphragm 100 and/or to adjust radial distance 128. In other alternative embodiments, fixture 500 is not adjustable to accommodate a range of sizes of diaphragm 100 and/or to adjust radial distance 128.

For example, but not by way of limitation, at least one of web 102 and ring 104 becomes axially and/or radially distorted during operation of steam turbine 10 with initial steam path 112. For another example, but not by way of limitation, at least one of web 102 and ring 104 becomes axially and/or radially distorted during a preheat process prior to welding replacement inner band 206 to web 102 and/or replacement outer band 208 to ring 104. For another example, but not by way of limitation, at least one of web 102 and ring 104 becomes axially and/or radially distorted during welding of replacement inner band 206 to web 102 and/or replacement outer band 208 to ring 104. Fixture 500 is operable, for example and without limitation, to make a first adjustment of relative axial position 126 and/or radial distance 128 along circumference 103 selectively adjacent each location 506 to compensate for initial distortion after operation with initial steam path 112, a second adjustment of relative axial position 126 and/or radial distance 128 along circumference 103 selectively adjacent each location 506 to compensate for distortion caused by the preheat process, a third adjustment of relative axial position 126 and/or radial distance 128 along circumference 103 selectively adjacent each location 506 to compensate for distortion during the welding process, and a fourth adjustment of relative axial position 126 and/or radial distance 128 along circumference 103 selectively adjacent each location 506 to effect stress relief within replacement steam path 212 after the welding process. Thus, fixture 500 facilitates coupling of replacement steam path 212 to diaphragm 100 while reducing or eliminating induced distortion of replacement steam path 212 during the coupling process.

In the exemplary embodiment, replacement steam path 212 is coupled to an original web 102 and an original ring 104. In alternative embodiments, at least one of web 102 and ring 104 is replaced with a respective one of a replacement web and a replacement ring (not shown). For example, but not by way of limitation, the respective replacement web and replacement ring are formed from a material having greater resistance to creep distortion, as compared to original web 102 and ring 104, in the operating environment of steam turbine 10.

Figure 6:
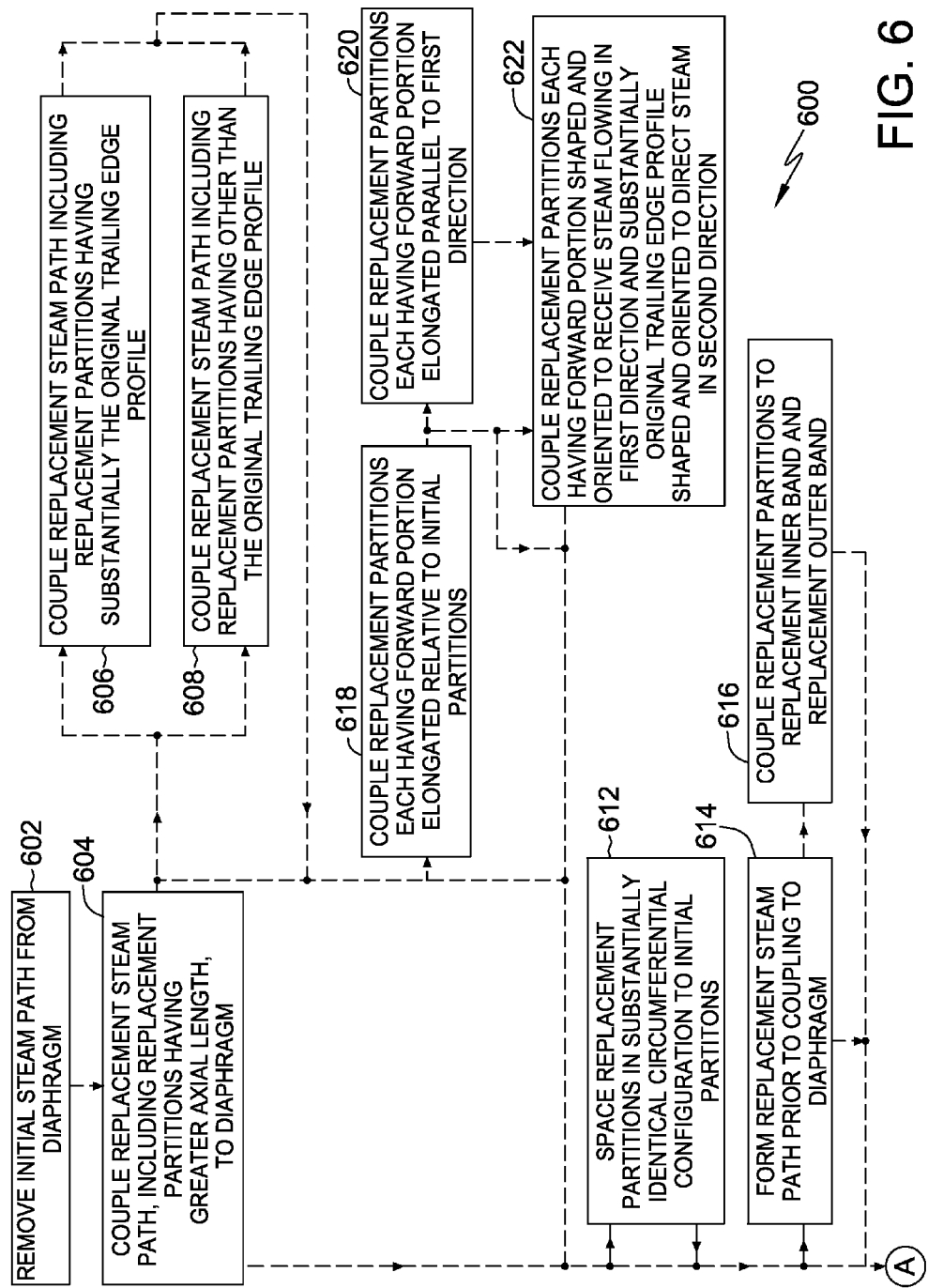
FIG. 6 is a flow diagram of an exemplary method of repairing a diaphragm, such as the exemplary diaphragm shown in FIG. 2, of a rotary machine, such as the exemplary steam turbine shown in FIG. 1.

An exemplary method 600 of repairing a diaphragm, such as diaphragm 100, of a rotary machine, such steam turbine 10, is illustrated in the flow diagram of FIGS. 6 and 7. With reference also to FIGS. 1-5, exemplary method 600 includes removing 602 an initial steam path, such as initial steam path 112, from the diaphragm. The initial steam path includes a plurality of initial partitions, such as initial partitions 110. Each initial partition is associated with an original trailing edge profile, such as the original trailing edge profile of trailing edge portion 160 of initial partition 110, and an original axial length, such as axial length 170. Method 600 also includes coupling 604 a replacement steam path, such as replacement steam path 212, to the diaphragm. The replacement steam path includes a plurality of replacement partitions, such as replacement partitions 210. Each replacement partition has a replacement axial length, such as axial length 270, that is greater than the original axial length.

In certain embodiments, the step of coupling 604 the replacement steam path to the diaphragm includes coupling 606 a replacement inner band of the replacement steam path, such as replacement inner band 206, to a radially inner web of the diaphragm, such as web 102, and coupling 608 a replacement outer band of the replacement steam path, such as replacement outer band 208, to a radially outer ring of the diaphragm, such as ring 104.

In some embodiments, the step of coupling 604 the replacement steam path to the diaphragm includes coupling 606 the replacement steam path including each replacement partition having a preselected trailing edge profile that is substantially the original trailing edge profile. In alternative embodiments, the step of coupling 604 the replacement steam path to the diaphragm includes coupling 608 the replacement steam path including each replacement partition having a preselected trailing edge profile that is other than substantially the original trailing edge profile.

In certain embodiments, the plurality of initial partitions are circumferentially spaced about the initial steam path, and method 600 further includes spacing 612 the plurality of replacement partitions in a substantially identical circumferential configuration to the plurality of initial partitions.

In some embodiments, method 600 also includes forming 614 the replacement steam path prior to the step of coupling 604 the replacement steam path to the diaphragm. In some such embodiments, the step of forming 614 the replacement steam path includes coupling 616 the plurality of replacement partitions to a replacement inner band and a replacement outer band, such as replacement inner band 206 and replacement outer band 208, such that the plurality of replacement partitions are circumferentially spaced and each replacement partition extends generally radially between the replacement inner band and the replacement outer band.

In certain embodiments, each initial partition and each replacement partition includes a forward portion, such as forward portion 150 and forward portion 250, respectively, defined downstream of a leading edge, such as leading edge 132 and leading edge 232, respectively, and the step of coupling 604 the replacement steam path to the diaphragm further includes coupling 618 the replacement steam path including the replacement partitions each having the forward portion elongated relative to the forward portion of the initial partitions. In some such embodiments, the forward portion of each initial partition and each replacement partition is shaped and oriented to receive steam flowing in a first direction, such as first direction 152, and the step of coupling 604 the replacement steam path to the diaphragm further includes coupling 620 the replacement steam path including the replacement partitions each having the forward portion elongated in a direction parallel to the first direction. Additionally or alternatively, the forward portion of each initial partition and each replacement partition is shaped and oriented to receive steam flowing in the first direction and the original trailing edge profile is shaped and oriented to direct the steam in a second direction, such as second direction 162, as the steam exits the diaphragm, and the step of coupling 604 the replacement steam path to the diaphragm further includes coupling 622 the replacement steam path including the replacement partitions each having the forward portion shaped and oriented to receive steam flowing in the first direction and substantially the original trailing edge profile shaped and oriented to direct the steam in the second direction.

In some embodiments, the diaphragm includes a radially inner web and a radially outer ring, such as web 102 and ring 104, and method 600 further includes coupling 624 the web and the ring to a fixture, such as fixture 500, operable to adjust at least one of a relative axial position and a radial distance, such as relative axial position 126 and/or radial distance 128, between the web and the ring. In some embodiments, the step of coupling 624 the web and the ring to the fixture includes coupling 626 the web and the ring to the fixture that is operable to adjust the at least one of the relative axial position and the radial distance between the web and the ring selectively at a plurality of locations along a circumference of the web, such as circumference 103. Additionally or alternatively, the fixture includes a strongback, such as strongback 502, and the step of coupling 624 the web and the ring to the fixture includes coupling 628 the web and the ring to the strongback. In some such embodiments, the fixture includes a plurality of circumferentially spaced clamps, such as clamps 504, coupled to the strongback, and the step of coupling 624 the web and the ring to the fixture further includes coupling 630 each of the clamps to a corresponding one of a plurality of locations proximate a circumference of the web, such as locations 506.

Moreover, in some such embodiments, method 600 also includes operating 632 at least one of the clamps to apply a force in an axial direction. Additionally, in some such embodiments, the step of operating 632 the at least one of the clamps includes operating 634 the at least one of the clamps to adjust the relative axial position of the web and the ring adjacent the corresponding one of the plurality of locations. Additionally or alternatively, the step of operating 632 the at least one of the clamps includes operating 636 the at least one of the clamps to apply at least one of a mechanical force, a pneumatic force, a hydraulic force, and a magnetic force to the web.

Additionally or alternatively, method 600 includes operating 638 the fixture to make a first adjustment of the at least one of the relative axial position and the radial distance to compensate for distortion of at least one of the web and the ring after operation of the rotary machine with the initial steam path. Additionally or alternatively, method 600 includes operating 640 the fixture to make a second adjustment of the at least one of the relative axial position and the radial distance to compensate for distortion of at least one of the web and the ring caused by a preheat process prior to the step of coupling 604 the replacement steam path to the diaphragm. Additionally or alternatively, the step of coupling 604 the replacement steam path to the diaphragm includes welding the replacement steam path to the diaphragm, and method 600 further includes operating 642 the fixture to make a third adjustment of the at least one of the relative axial position and the radial distance to compensate for distortion of at least one of the web and the ring during welding of the replacement steam path to the diaphragm. Additionally or alternatively, method 600 includes operating 644 the fixture to make a fourth adjustment of the at least one of the relative axial position and the radial distance to effect stress relief within the replacement steam path after the step of coupling 604 the replacement steam path to the diaphragm.

Exemplary embodiments of a method and fixture for repairing a diaphragm of a rotary machine with a replacement steam path that includes replacement partitions are described above in detail. The embodiments provide advantages in that an increased axial length of the replacement partitions provides greater resistance to axial creep during future operations, thereby increasing a time period of operation of the rotary machine before another repair is needed. Some embodiments provide further advantages in that the replacement partitions have a preselected trailing edge profile that duplicates the original trailing edge profile of the original partitions of the diaphragm, facilitating restoring efficient operation of a downstream row of rotor blades as provided by the original partitions. Alternatively, some embodiments provide further advantages in that the replacement partitions have a preselected trailing edge profile that differs from the original trailing edge profile of the original partitions of the diaphragm, facilitating improved efficiency for user operating points that differ from the design operating point associated with the original trailing edge profile. Additionally, certain embodiments provide further advantages in that the rotary machine remains operable with the original partitions while the replacement steam path is formed, reducing a required out-of-service time of the rotary machine for installation of the replacement partitions. Moreover, some embodiments provide further advantages in that the fixture is operable to adjust at least one of a relative axial position of, and a radial distance between, the web and the ring of the diaphragm selectively at a plurality of locations along a circumference of the web, facilitating coupling of the replacement steam path to the web and ring with improved precision in axial positioning of the replacement steam path, and/or with reduced or eliminated distortion of the replacement steam path.

Exemplary embodiments of methods and apparatus for repairing a diaphragm of a rotary machine are described above in detail. The methods and apparatus are not limited to the specific embodiments described herein, but rather, components of the apparatus and/or steps of the methods may be utilized independently and separately from other components and/or steps described herein. For example, the exemplary embodiments can be implemented and utilized in connection with many other rotary machines.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of repairing a diaphragm of a rotary machine, said method comprising:
    removing an initial steam path from the diaphragm, the initial steam path including a plurality of initial partitions, each initial partition associated with an original trailing edge profile and an original axial length;
    coupling a replacement steam path to the diaphragm, the replacement steam path including a plurality of replacement partitions, each replacement partition having a replacement axial length that is greater than the original axial length, wherein the diaphragm includes a radially inner web and a radially outer ring;
    coupling the web and the ring to a fixture operable to adjust at least one of an axial position of the web relative to the ring and a radial distance between the web and the ring; and
    operating the fixture to make a first adjustment of the at least one of the relative axial position and the radial distance to compensate for distortion of at least one of the web and the ring after operation of the rotary machine with the initial steam path.

2. The method of claim 1, wherein the fixture includes a strongback, said coupling the web and the ring to the fixture comprises coupling the web and the ring to the strongback.

3. The method of claim 2, wherein the fixture includes a plurality of circumferentially spaced clamps coupled to the strongback, said coupling the web and the ring to the fixture further comprises coupling each of the clamps to a corresponding one of a plurality of locations proximate a circumference of the web.

4. The method of claim 3, further comprising operating at least one of the clamps to apply a force in an axial direction.

5. The method of claim 4, wherein said operating the at least one of the clamps comprises operating the at least one of the clamps to adjust the relative axial position of the web and the ring adjacent the corresponding one of the plurality of locations.

6. The method of claim 4, wherein said operating the at least one of the clamps comprises operating the at least one of the clamps to apply at least one of a mechanical force, a pneumatic force, a hydraulic force, and a magnetic force to the web.

7. The method of claim 1, wherein each initial partition and each replacement partition includes a forward portion defined downstream of a leading edge, said coupling the replacement steam path to the diaphragm further comprises coupling the replacement steam path including the replacement partitions each having the forward portion elongated relative to the forward portion of the initial partitions.

8. The method of claim 7, wherein the forward portion of each initial partition and each replacement partition is shaped and oriented to receive steam flowing in a first direction, said coupling the replacement steam path to the diaphragm further comprises coupling the replacement steam path including the replacement partitions each having the forward portion elongated in a direction parallel to the first direction.

9. The method of claim 7, wherein the forward portion of each initial partition is shaped and oriented to receive steam flowing in a first direction and the original trailing edge profile is shaped and oriented to direct the steam in a second direction as the steam exits the diaphragm, said coupling the replacement steam path to the diaphragm further comprises coupling the replacement steam path including the replacement partitions each having the forward portion shaped and oriented to receive steam flowing in the first direction and substantially the original trailing edge profile shaped and oriented to direct the steam in the second direction.

10. The method of claim 1, further comprising forming the replacement steam path prior to said coupling the replacement steam path to the diaphragm.

11. The method of claim 10, wherein said forming the replacement steam path comprises coupling the plurality of replacement partitions to a replacement inner band and a replacement outer band, such that the plurality of replacement partitions are circumferentially spaced and each replacement partition extends generally radially between the replacement inner band and the replacement outer band.

12. The method of claim 1, wherein said coupling the replacement steam path to the diaphragm comprises welding the replacement steam path to the diaphragm, said method further comprising operating the fixture to make a third adjustment of the at least one of the relative axial position and the radial distance to compensate for distortion of at least one of the web and the ring during said welding the replacement steam path to the diaphragm.

13. The method of claim 12, further comprising operating the fixture to make a fourth adjustment of the at least one of the relative axial position and the radial distance to effect stress relief within the replacement steam path after said coupling the replacement steam path to the diaphragm.

14. The method of claim 1, wherein said coupling the replacement steam path to the diaphragm comprises:
coupling a replacement inner band of the replacement steam path to a radially inner web of the diaphragm; and
coupling a replacement outer band of the replacement steam path to a radially outer ring of the diaphragm.

15. The method of claim 1, wherein said coupling the replacement steam path to the diaphragm further comprises coupling the replacement steam path including each replacement partition having a preselected trailing edge profile that is substantially the original trailing edge profile.

16. The method of claim 1, wherein said coupling the replacement steam path to the diaphragm further comprises coupling the replacement steam path including each replacement partition having a preselected trailing edge profile that is other than substantially the original trailing edge profile.

17. The method of claim 1, wherein said coupling the web and the ring to the fixture comprises coupling the web and the ring to the fixture that is operable to adjust the at least one of the relative axial position and the radial distance selectively at a plurality of locations along a circumference of the web.

18. The method of claim 1, further comprising operating the fixture to make a second adjustment of the at least one of the relative axial position and the radial distance to compensate for distortion of at least one of the web and the ring caused by a preheat process prior to said coupling the replacement steam path to the diaphragm.

* * * * *